(12) United States Patent
Ikuta et al.

(10) Patent No.: US 11,221,410 B2
(45) Date of Patent: Jan. 11, 2022

(54) LIGHT SENSOR, ELECTRONIC DEVICE, COMPUTATION APPARATUS, AND METHOD FOR MEASURING DISTANCE BETWEEN LIGHT SENSOR AND SENSING OBJECT

(71) Applicant: SHARP KABUSHIKI KAISHA, Sakai (JP)

(72) Inventors: Yoshiki Ikuta, Sakai (JP); Takuma Hiramatsu, Sakai (JP); Takayuki Shimizu, Sakai (JP); Hideki Sato, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 279 days.

(21) Appl. No.: 16/613,366

(22) PCT Filed: Feb. 20, 2018

(86) PCT No.: PCT/JP2018/006058
§ 371 (c)(1),
(2) Date: Nov. 13, 2019

(87) PCT Pub. No.: WO2018/211762
PCT Pub. Date: Nov. 22, 2018

(65) Prior Publication Data
US 2020/0191958 A1 Jun. 18, 2020

(30) Foreign Application Priority Data
May 15, 2017 (JP) .............................. JP2017-096699

(51) Int. Cl.
*G01S 17/10* (2020.01)
*G01S 7/48* (2006.01)
(Continued)

(52) U.S. Cl.
CPC ................ *G01S 17/10* (2013.01); *G01C 3/06* (2013.01); *G01S 7/4808* (2013.01);
(Continued)

(58) Field of Classification Search
None
See application file for complete search history.

(56) References Cited

U.S. PATENT DOCUMENTS

2013/0175435 A1 7/2013 Drader
2014/0231631 A1 8/2014 Moore et al.
(Continued)

FOREIGN PATENT DOCUMENTS

EP 3370078 A1 * 9/2018 ............. G01S 17/10
JP 2010-091377 A 4/2010
(Continued)

OTHER PUBLICATIONS

JP2016-161438 machine translation to english (Year: 2016).*
(Continued)

*Primary Examiner* — Arleen M Vazquez
*Assistant Examiner* — Terence E Stifter, Jr.
(74) *Attorney, Agent, or Firm* — ScienBiziP, P.C.

(57) ABSTRACT

A light sensor or the like that has an improved measurement speed is realized. A light sensor includes a computation unit that computes a distance between the light sensor and a sensing object on the basis of a difference between a center position of reflection light, which indicates a center position of distribution of light reception probability of a first light receiving unit in a first histogram, and a center position of reference light, which indicates a center position of distribution of light reception probability of a second light receiving unit in a second histogram.

15 Claims, 12 Drawing Sheets

(51) Int. Cl.
  *G01S 7/4865* (2020.01)
  *G01C 3/06* (2006.01)
  *G01S 7/487* (2006.01)
  *G06F 17/18* (2006.01)

(52) U.S. Cl.
  CPC .......... *G01S 7/4865* (2013.01); *G01S 7/4876* (2013.01); *G06F 17/18* (2013.01)

(56) References Cited

U.S. PATENT DOCUMENTS

| | | | |
|---|---|---|---|
| 2016/0033644 A1* | 2/2016 | Moore | G01S 7/4865 356/5.01 |
| 2019/0293771 A1* | 9/2019 | Sato | G01S 7/487 |
| 2020/0233066 A1* | 7/2020 | Kulesh | G01S 17/931 |

FOREIGN PATENT DOCUMENTS

| | | | |
|---|---|---|---|
| JP | 2012-060012 A | | 3/2012 |
| JP | 2016161438 A | * | 9/2016 |
| JP | 6020547 B2 | | 11/2016 |

OTHER PUBLICATIONS

Cristiano Niclass et al., "Design and Characterization of a CMOS 3-D Image Sensor Based on Single Photon Avalanche Diodes", IEEE Journal of Solid-State Circuits, vol. 40, No. 9, Sep. 2005 pp. 1847-1854.

* cited by examiner

LIGHT SENSOR, ELECTRONIC DEVICE, COMPUTATION APPARATUS, AND METHOD FOR MEASURING DISTANCE BETWEEN LIGHT SENSOR AND SENSING OBJECT

TECHNICAL FIELD

The present invention relates to a light sensor, an electronic device, a computation apparatus, and a method for measuring a distance between the light sensor and a sensing object.

BACKGROUND ART

In optical communication or measurement of a time of flight (TOF) or the like, an avalanche photodiode utilizing an avalanche amplification (avalanche) effect of a photodiode has been conventionally used as a light receiving element that detects weak light at high speed (for example, refer to PTL 1). When a reverse bias voltage less than a breakdown voltage is applied, the avalanche photodiode operates in a linear mode and an output current varies so as to have a positive correlation with a light receiving amount. On the other hand, when a reverse bias voltage equal to or more than the breakdown voltage is applied, the avalanche photodiode operates in a Geiger mode. The avalanche photodiode in the Geiger mode causes an avalanche phenomenon even in a case of incidence of a single photon, so that a large output current is obtained. Thus, the avalanche photodiode in the Geiger mode is called a single photon avalanche diode (SPAD).

When a quenching resistor is applied in series to the avalanche photodiode in the Geiger mode, a binary pulse output is able to be obtained. Such a circuit is constituted by, for example, a photodiode, an active quenching resistor (resistor component of a MOS transistor), and a buffer.

The aforementioned photodiode is the avalanche photodiode in the Geiger mode, and, when being applied with the bias voltage equal to or more than the breakdown voltage, causes an avalanche phenomenon for incidence of a single photon, so that a current flows. When the current flows through the aforementioned active quenching resistor connected in series to the photodiode, a voltage between terminals of the active quenching resistor increases, and the bias voltage of the photodiode drops accordingly, so that the avalanche phenomenon stops. When there is no current by the avalanche phenomenon, the voltage between the terminals of the active quenching resistor decreases, and the photodiode returns to a state of being applied with the bias voltage equal to or more than the breakdown voltage again. By the aforementioned buffer, the change of the voltage between the photodiode and the active quenching resistor is extracted as a binary pulse output.

PTL 2 discloses a method for measuring a distance in such a manner that reflection light by a light emitting element and direct light from the light emitting element are input to different delay locked loop circuits (DLLs) with use of the aforementioned SPAD and a delay amount between outputs of the two DLLs is converted into a digital value.

NPL 1 and PTL 3 disclose a method for measuring a distance by obtaining a maximum value of a histogram created by using the aforementioned SPAD and a TDC (time to digital convertor).

CITATION LIST

Patent Literature

PTL 1: Japanese Unexamined Patent Application Publication No. 2012-060012 (published on Mar. 22, 2012)
PTL 2: US2014/0231631 (published on Aug. 21, 2014)
PTL 3: Japanese Patent No. 6020547 (registered on Oct. 14, 2016)
NPL 1: C. Niclass, A. Rochas, P.-A. Besse and E. Charbon: "Design and characterization of a CMOS 3-D image sensor based on single photon Avalanche diodes," IEEE J. Solid-State Circ., 40 (2005) 1847-1854.

SUMMARY OF INVENTION

Technical Problem

For example, in use of AF (Auto Focus) of a camera, resolution of order of millimeters has been recently required. In order to achieve resolution of 1 mm, for example, a TDC with resolution of about 7 ps and a light emission pulse with a width close to the resolution are required. As the resolution increases, the number of bins of a histogram also increases. This causes a problem that a processing process and/or a circuit size take/takes a lot of costs.

A method for estimating a delay amount by a DLL is advantageous for the resolution. In a case where a signal component includes a crosstalk component, however, an effect of the crosstalk component increases. The effect is markedly observed as a distance between a sensing object and a light sensor becomes long. Thus, for example, in a case where the signal component includes a crosstalk component by reflection from a cover glass, it is essential to correct a measurement result by computation. In a case where the distance between the sensing object and the light sensor is long, however, there is a problem that accuracy of the measurement result is extremely lowered.

Further, the method for estimating the delay amount by the DLL causes a phase of a DLL circuit to converge to an output position of a pulse generated with a delay amount corresponding to the distance to the sensing object on a spatial light path. Therefore, in order to obtain a highly accurate measurement result, a certain number of pulse outputs need to be obtained from a single photon avalanche diode. However, when the sensing object is at a remote place or when a reflectance is low, a pulse generation ratio of the single photon avalanche diode is low. Thus, the method for estimating the delay amount by the DLL has a problem that a long measurement time is required to obtain a large number of pulses.

The invention is made in view of the aforementioned problems and an object thereof is to achieve a light sensor, an electronic device, a computation apparatus, and a method for measuring a distance between the light sensor and a sensing object, which have an improved measurement speed.

Solution to Problem

In order to solve the aforementioned problems, a light sensor according to the invention is a light sensor that measures a distance to a sensing object, and includes: a light emitting element that radiates pulse light to the sensing object; one or more first light receiving units of a photon count-type that output a first pulse synchronized with incidence of a photon by at least one of reflection light by the sensing object, first disturbance light, and reflection light by an inside of the light sensor; one or more first histogram generation units that generate a first histogram indicating a relationship between an output time and a pulse frequency of the first pulse; a second light receiving unit of a photon count-type that outputs a second pulse synchronized with incidence of a photon by at least any of second disturbance light and reference light from the light emitting element; a second histogram generation unit that generates a second histogram indicating a relationship between an output time and a pulse frequency of the second pulse; and a computation unit that computes the distance between the light sensor and the sensing object on a basis of a difference between a center position of reflection light, which indicates a center position of distribution of light reception probability of the first light receiving unit in the first histogram, and a center position of reference light, which indicates a center position of distribution of light reception probability of the second light receiving unit in the second histogram, in which a component corresponding to the reflection light by the sensing object is an object reflection light component, a component corresponding to the first disturbance light is a first disturbance light component, a component corresponding to the reflection light by the inside of the light sensor is a crosstalk component in the first histogram, and a component corresponding to the reference light from the light emitting element is a reference light reception component and a component corresponding to the second disturbance light is a second disturbance light component in the second histogram.

According to the aforementioned configuration, the light sensor according to an aspect of the invention measures the distance between the light sensor and the sensing object through computation processing. As a result, the light sensor according to the aspect of the invention is able to improve a time required to measure the distance between the light sensor and the sensing object.

Moreover, the light sensor according to the aspect of the invention computes the distance between the light sensor and the sensing object by considering the crosstalk component, the first disturbance light component, and the second disturbance light component. As a result, the light sensor according to the aspect of the invention is able to measure the distance between the light sensor and the sensing object with high resolution.

Further, the light sensor according to the aspect of the invention does not need a delay locked loop circuit (DLL) differently from a method for estimating a delay amount by the DLL. Accordingly, the light sensor according to the aspect of the invention is able to measure the distance between the light sensor and the sensing object by a more inexpensive configuration than a conventional configuration.

In order to solve the aforementioned problems, a computation apparatus according to the invention is a computation apparatus applied to a light sensor that measures a distance to a sensing object, in which the light sensor includes: a light emitting element that radiates pulse light to the sensing object; one or more first light receiving units of a photon count-type that output a first pulse synchronized with incidence of a photon by at least one of reflection light by the sensing object, first disturbance light, and reflection light by an inside of the light sensor; and a second light receiving unit of a photon count-type that outputs a second pulse synchronized with incidence of a photon by at least any of second disturbance light and reference light from the light emitting element; and the computation apparatus includes: one or more first histogram generation units that generate a first histogram indicating a relationship between an output time and a pulse frequency of the first pulse; a second histogram generation unit that generates a second histogram indicating a relationship between an output time and a pulse frequency of the second pulse; and a computation unit that computes the distance between the light sensor and the sensing object on a basis of a difference between a center position of reflection light, which indicates a center position of distribution of light reception probability of the first light receiving unit in the first histogram, and a center position of reference light, which indicates a center position of distribution of light reception probability of the second light receiving unit in the second histogram, in which a component corresponding to the reflection light by the sensing object is an object reflection light component, a component corresponding to the first disturbance light is a first disturbance light component, a component corresponding to the reflection light by the inside of the light sensor is a crosstalk component in the first histogram, and a component corresponding to the reference light from the light emitting element is a reference light reception component and a component corresponding to the second disturbance light is a second disturbance light component in the second histogram.

According to the aforementioned configuration, an effect similar to that of the light sensor described above is exerted.

In order to solve the aforementioned problems, a method according to the invention is a method for measuring a distance between a light sensor and a sensing object, and the method includes the steps of: radiating pulse light from a light emitting element included in the light sensor and outputting a first pulse synchronized with incidence of a photon by at least one of reflection light by the sensing object, first disturbance light, and reflection light by an inside of the light sensor; generating a first histogram indicating a relationship between an output time and a pulse frequency of the first pulse; outputting a second pulse synchronized with incidence of a photon by at least any of second disturbance light and reference light from the light emitting element; generating a second histogram indicating a relationship between an output time and a pulse frequency of the second pulse; and computing the distance between the light sensor and the sensing object on a basis of a difference between a center position of reflection light, which indicates a center position of distribution of light reception probability of the first light receiving unit in the first histogram, and a center position of reference light, which indicates a center position of distribution of light reception probability of the second light receiving unit in the second histogram, in which a component corresponding to the reflection light by the sensing object is an object reflection light component, a component corresponding to the first disturbance light is a first disturbance light component, a component corresponding to the reflection light by the inside of the light sensor is a crosstalk component in the first histogram, and a component corresponding to the reference light from the light emitting element is a reference light reception component and a component corresponding to the second disturbance light is a second disturbance light component in the second histogram.

According to the aforementioned configuration, an effect similar to that of the light sensor described above is exerted.

Advantageous Effects of Invention

A light sensor, an electronic device, a computation apparatus, and a method for measuring a distance between the light sensor and a sensing object according to an aspect of the invention are able to improve a time required to measure a distance between the light sensor and the sensing object.

BRIEF DESCRIPTION OF DRAWINGS

FIG. 6 illustrates a histogram when a maximum bin is searched for.

DESCRIPTION OF EMBODIMENTS

Embodiments of the invention will be described below.

Embodiment 1

A light sensor 100 according to Embodiment 1 will be described below.

Figure 1:
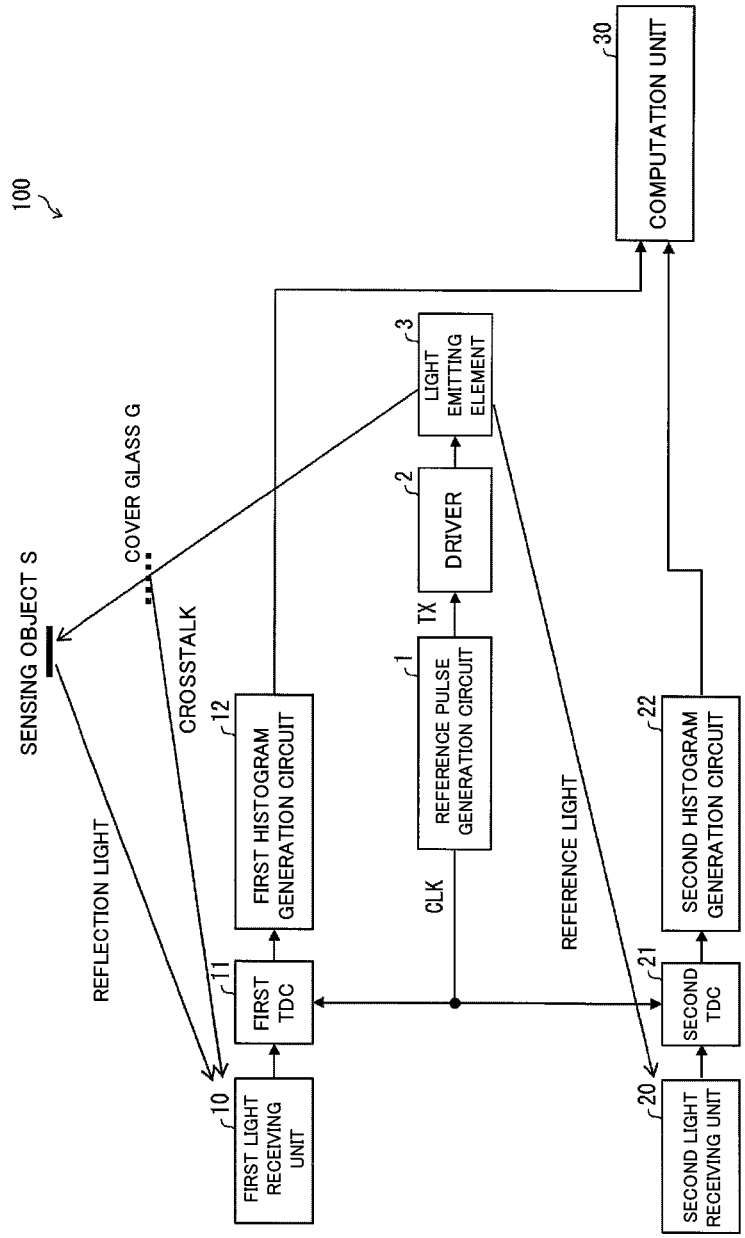
FIG. 1 is a block diagram illustrating a schematic configuration of a light sensor according to an embodiment of the invention.

FIG. 1 is a block diagram illustrating a schematic configuration of the light sensor 100 according to Embodiment 1.

The light sensor 100 includes a reference pulse generation circuit 1, a driver 2, a light emitting element 3, a first light receiving unit 10, a first TDC 11 (TDC: time to digital convertor), a first histogram generation circuit 12, a second light receiving unit 20, a second TDC 21, a second histogram generation circuit 22, and a computation unit 30. The respective configurations will be specifically described below with reference to FIG. 2 and the like.

Figure 2:
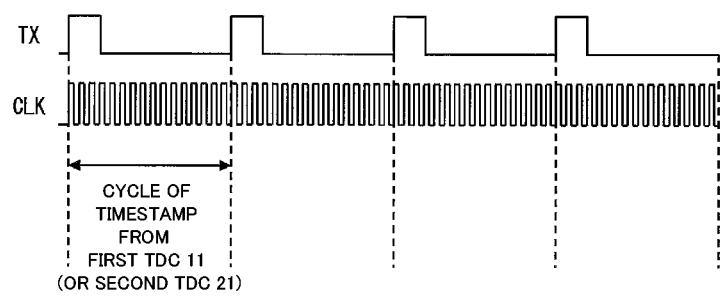
FIG. 2 illustrates a timing chart according to a reference pulse generation circuit.

FIG. 2 illustrates a timing chart according to the reference pulse generation circuit 1. The reference pulse generation circuit 1 applies a reference pulse ("TX" in FIGS. 1 and 2) of a waveform to the driver 2. The reference pulse generation circuit 1 also applies a reference clock signal ("CLK" in FIGS. 1 and 2) to the first TDC 11 and the second TDC 21. A cycle of a timestamp output from the first TDC 11 to the first histogram generation circuit 12 is similar to a cycle of the reference pulse. Similarly, a cycle of a timestamp output from the second TDC 21 to the second histogram generation circuit 22 is similar to the cycle of the reference pulse.

The driver 2 causes the light emitting element 3 to radiate pulse light on the basis of the reference pulse. The pulse light radiated from the light emitting element 3 is reflected by a sensing object S and an inside of the sensor and incident on the first light receiving unit 10 (hereinafter, description will be given by assuming that the reflection of the pulse light by the inside of the sensor is reflection of the pulse light by a cover glass G). Further, the pulse light radiated from the light emitting element 3 is directly incident on the second light receiving unit 20. Hereinafter, the light directly incident on the second light receiving unit 20 is referred to as "reference light".

The first light receiving unit 10 is a light receiving unit of a photon count-type that outputs, to the first TDC 11, a pulse (first pulse) synchronized with incidence of a photon by at least one of the reflection light by the sensing object S, disturbance light (first disturbance light), and the reflection light by the cover glass G (first output step). The "disturbance light" may be used with a concept also including dark noise indicating noise by a thermally generated carrier of a dark current. Note that, the following description will be given by assuming that the disturbance light and the dark noise have different concepts.

Figure 3:
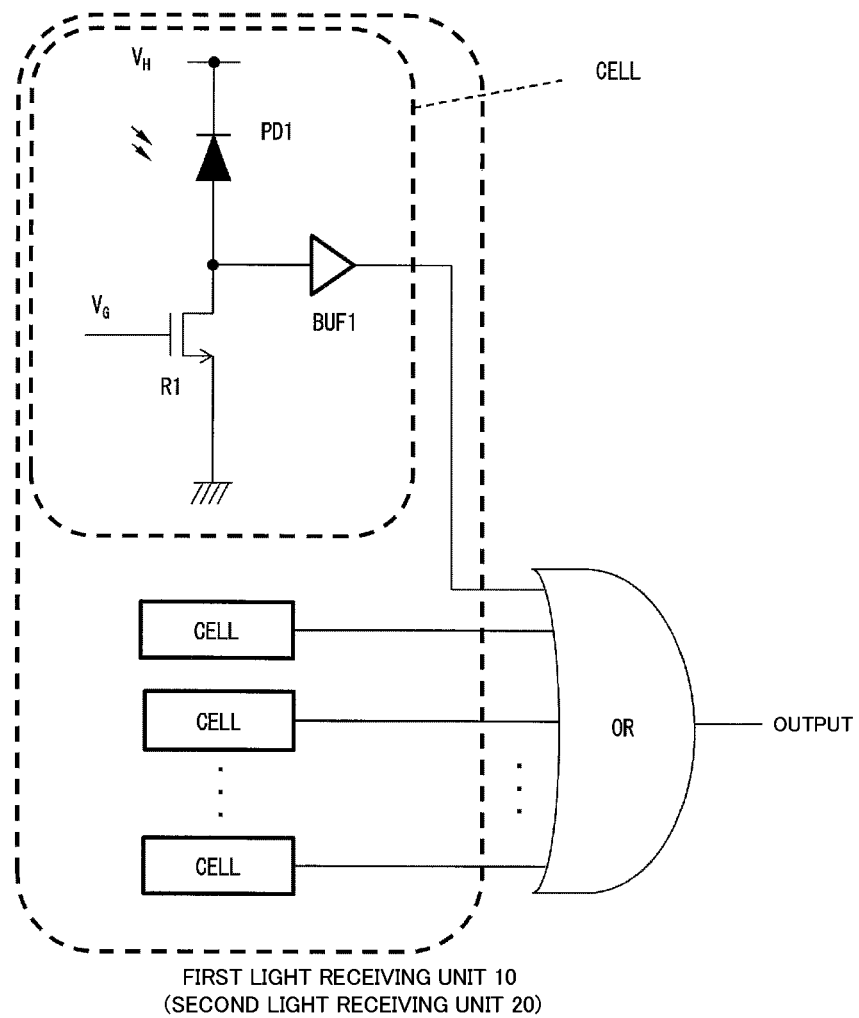
FIG. 3 is a circuit diagram illustrating a schematic configuration of a first light receiving unit and a second light receiving unit.

FIG. 3 is a circuit diagram illustrating a schematic configuration of the first light receiving unit 10 and the second light receiving unit 20. The first light receiving unit 10 and the second light receiving unit 20 are the same in the configuration, so that description will be given by taking the first light receiving unit 10 as an example.

The first light receiving unit 10 has a plurality of cells each constituted by a photodiode PD1, an active quenching resistor R1 (resistor component of a MOS transistor), and a buffer BUF1. The photodiode PD1 is an avalanche photodiode in a Geiger mode and extracts an incident light amount as a binary pulse output by the active quenching resistor R1 and the buffer BUF1. An output of each of the cells is subjected to an OR operation by an OR circuit and output to the first TDC 11.

The first TDC 11 outputs, to the first histogram generation circuit 12, a timestamp indicating a pulse output time of the pulse output by the first light receiving unit 10.

The first histogram generation circuit 12 generates a histogram (first histogram) indicating a relationship between the output time and a pulse frequency of the pulse output by the first light receiving unit 10 (first histogram generation step). More specifically, the first histogram generation circuit 12 receives the timestamp from the first TDC 11 and increases a count value of a bin corresponding to the timestamp. Then, the first histogram generation circuit 12 counts the timestamp for a certain cycle and generates a histogram on the basis of the count.

The second light receiving unit 20 is a light receiving unit of a photon count-type that outputs, to the second TDC 21, a pulse (second pulse) synchronized with incidence of a photon by at least one of the aforementioned reference light and disturbance light (second disturbance light) (second output step). The second light receiving unit 20 has a configuration similar to that of the first light receiving unit 10 described with reference to FIG. 3.

The second TDC 21 outputs, to the second histogram generation circuit 22, a timestamp indicating a pulse output time of the pulse output by the second light receiving unit 20.

The second histogram generation circuit 22 generates a histogram (second histogram) indicating a relationship between the output time and a pulse frequency of the pulse output by the second light receiving unit 20 (second histogram generation step). More specifically, the second histogram generation circuit 22 receives the timestamp from the second TDC 21 and increases a count value of a bin corresponding to the timestamp. Then, the second histogram generation circuit 22 counts the timestamp for a certain cycle and generates a histogram on the basis of the count.

Figure 4:
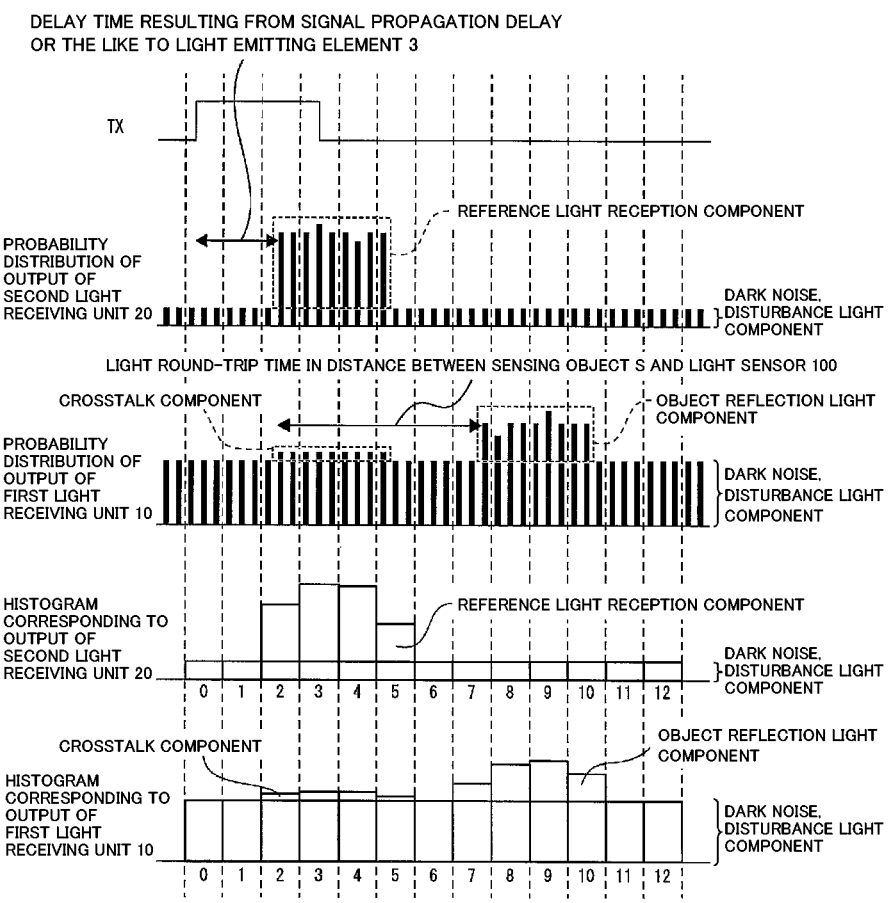
FIG. 4 illustrates an example of histograms generated by a first histogram generation circuit and a second histogram generation circuit.

FIG. 4 illustrates an example of histograms generated by the first histogram generation circuit 12 and the second histogram generation circuit 22. The example of FIG. 4 indicates a histogram of bins of 0 to 12.

FIG. 4 indicates "TX", "probability distribution of output of second light receiving unit 20", "probability distribution of output of first light receiving unit 10", "histogram corresponding to output of second light receiving unit 20", and "histogram corresponding to output of first light receiving unit 10" from the top. The histogram is output in a state of including a count value corresponding to dark noise, a disturbance light component, and/or a crosstalk component to the computation unit 30. FIG. 4 will be described below.

The light emitting element 3 radiates pulse light on the basis of a reference pulse indicated by TX. The light emitting element 3 may radiate, to the sensing object S, pulse light with a pulse width equal to or more than twice time resolution of the first TDC 11 and the second TDC 21. The reference light from the light emitting element 3 is incident on the second light receiving unit 20. The "probability distribution of output of second light receiving unit 20" in FIG. 4 indicates distribution of probability that a reference light reception component, dark noise, and a disturbance light component appear in the histogram. The reference light reception component appears in the histogram after "delay time resulting from signal propagation delay or the like to light emitting element 3" has lapsed. The dark noise and the disturbance light component regularly appear in the histogram.

The "probability distribution of output of first light receiving unit 10" in FIG. 4 indicates distribution of probability that a crosstalk component, an object reflection light component, dark noise, and a disturbance light component appear in the histogram. The crosstalk component appears in the histogram after "light round-trip time between cover glass G and light sensor 100" has lapsed. The object reflection light component appears in the histogram after "light round-trip time between sensing object S and light sensor 100" has lapsed. The dark noise and the disturbance light component regularly appear in the histogram.

The computation unit 30 computes a distance between the sensing object S and the light sensor 100 by using the histograms input from the first histogram generation circuit 12 and the second histogram generation circuit 22.

Note that, the first TDC 11, the first histogram generation circuit 12, the second light receiving unit 20, the second TDC 21, the second histogram generation circuit 22, and/or the computation unit 30 may be provided in any of an inside and an outside of the light sensor 100. For example, considered is a configuration in which the light sensor 100 includes the first light receiving unit 10 and the second light receiving unit 20 and a computation apparatus positioned in the outside of the light sensor 100 includes the first histogram generation circuit 12, the second light receiving unit 20, the second TDC 21, the second histogram generation circuit 22, and the computation unit 30. In this case, the first light receiving unit 10 and the first TDC 11 may be connected and the second light receiving unit 20 and the second TDC 21 may be connected each in a communicable manner, and the distance between the sensing object S and the light sensor 100 is able to be computed by a method described later.

Computation performed by the computation unit 30 will be described below with reference to FIG. 5 and the like.

[Computation Performed by Computation Unit 30]

Figure 5:
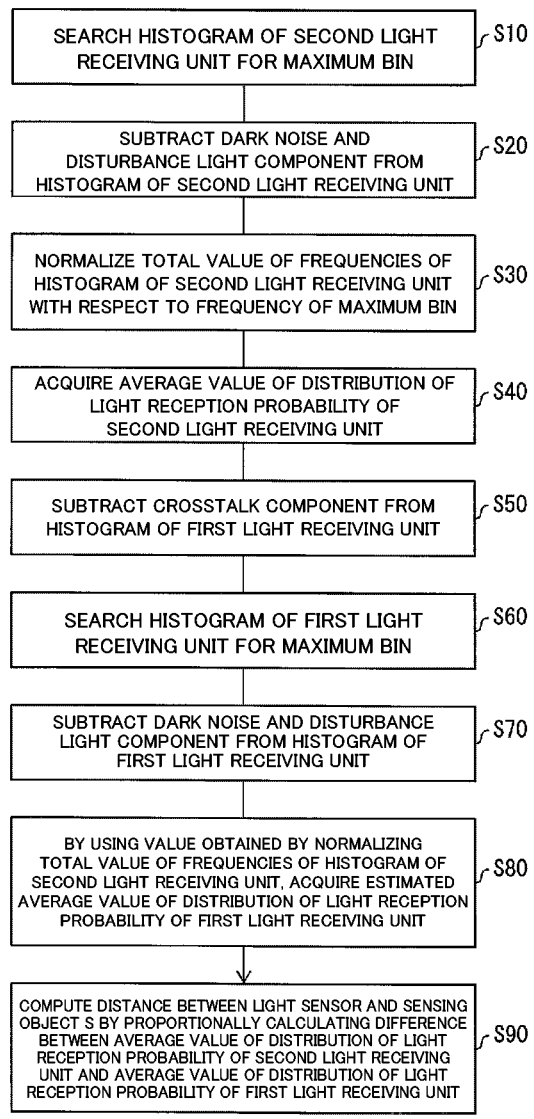
FIG. 5 is a flowchart illustrating a flow in which a computation unit computes a distance between a sensing object S and the light sensor.

FIG. 5 is a flowchart illustrating a flow in which the computation unit 30 computes the distance between the sensing object S and the light sensor 100.

Figure 6:
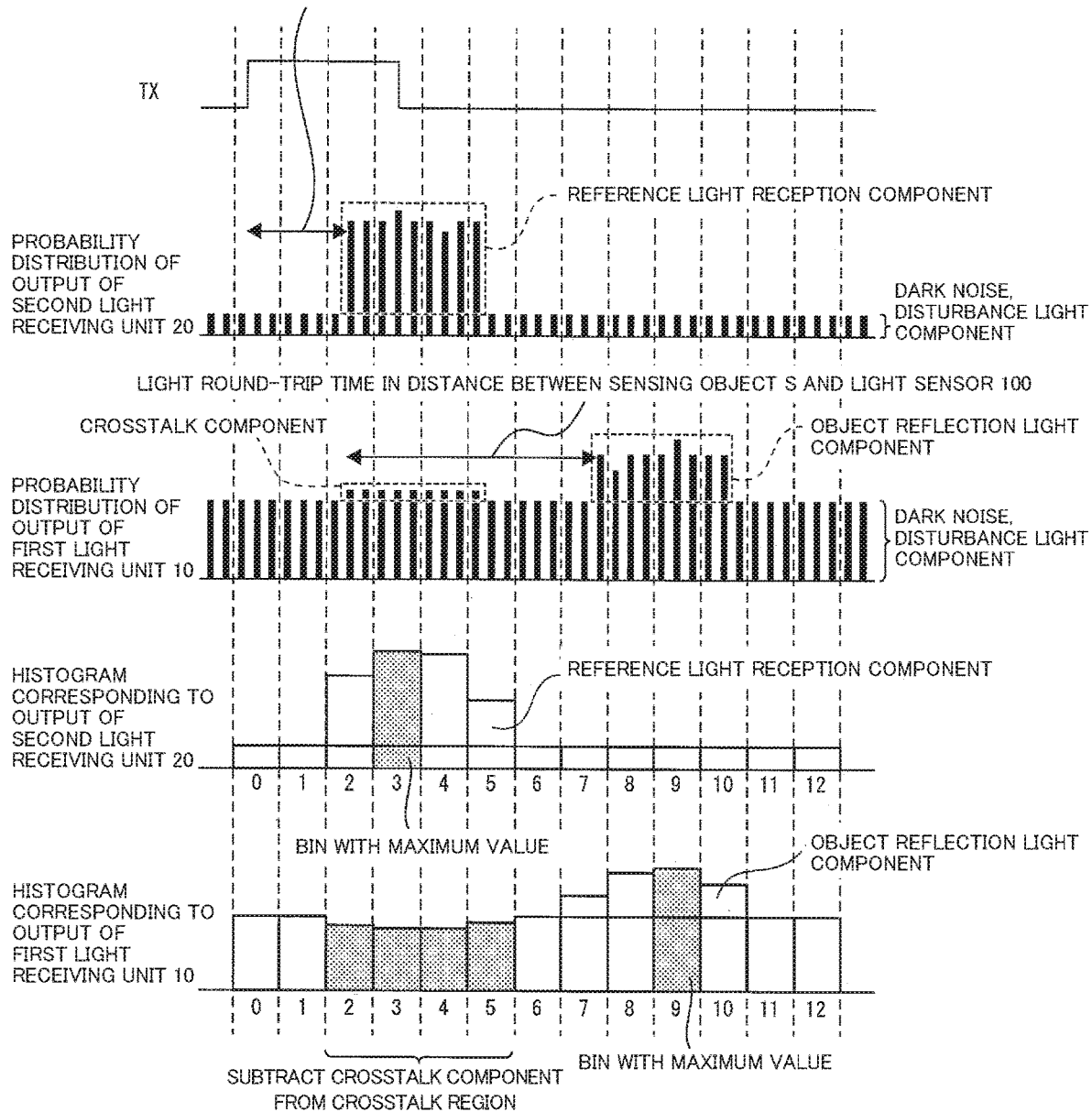

First, the computation unit 30 searches the histogram of the second light receiving unit 20 for a maximum bin (bin whose count value is maximum) in the histogram of the second light receiving unit 20 (S10). This will be described with reference to FIG. 6. FIG. 6 illustrates a histogram when the maximum bin is searched for.

As illustrated in FIG. 6, the maximum bin in the histogram of the second light receiving unit 20 is 3. Thus, the computation unit 30 searches that the maximum bin in the histogram of the second light receiving unit 20 is 3 from the histogram of the second light receiving unit 20.

Figure 7:
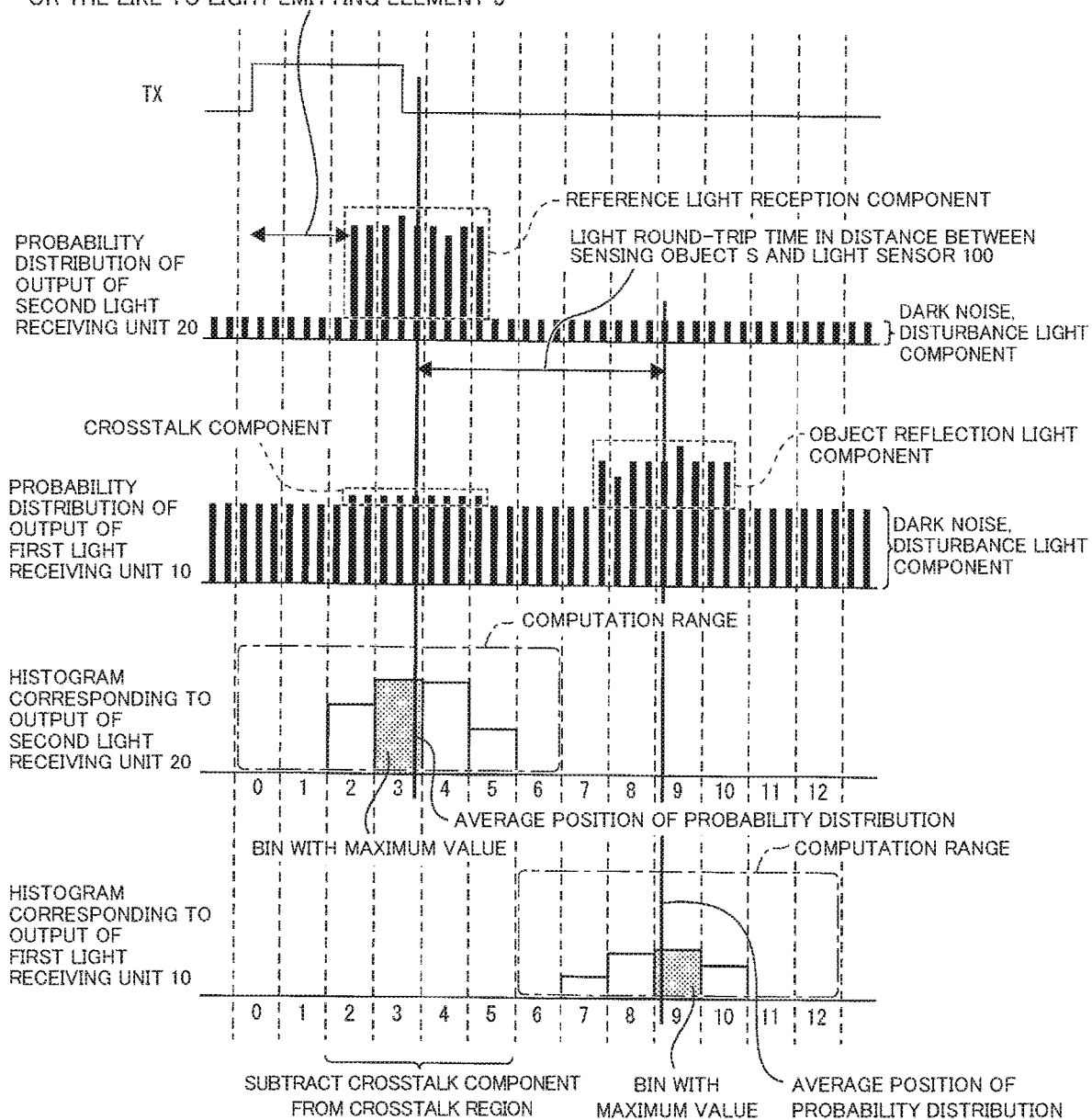
FIG. 7 illustrates a histogram obtained after subtracting dark noise and a disturbance light component.

Next, the computation unit 30 creates a histogram by subtracting the dark noise and the disturbance light component from the histogram of FIG. 6 (S20). FIG. 7 illustrates a histogram obtained after subtracting the dark noise and the disturbance light component. As clear from comparison of FIGS. 6 and 7, a count value (subtraction value) of the dark noise and the disturbance light component is subtracted from the histogram in FIG. 7.

The subtraction value of the dark noise and the disturbance light component is obtained by acquiring a count value of a period other than a period in which the histogram is generated or a count value of a period in which the light emitting element 3 does not emit light in the middle of the period in which the histogram is generated. For example, the count value of the dark noise and the disturbance light component to be subtracted from one bin of the histogram is able to be computed by the following formula (1).

$$(Camb \times Tsig)/(B \times Tamb) \quad (1)$$

Camb: count value of non-light emission time of light emitting element 3

Tsig: histogram generation time

B: the number of bins of histogram

Tamb: non-light emission time of light emitting element 3

Subsequently, the computation unit 30 specifies a bin range (computation range) to be computed in the "histogram corresponding to output of second light receiving unit 20" in FIG. 7 as 0 to 6 and then normalizes a total value of frequencies of the histogram of the second light receiving unit 20 with respect to a frequency of the maximum bin (S30).

Specifically, the computation unit 30 computes a value represented by the following formula (2).

$$F2/F\max 2 \quad (2)$$

F2: total value of count values after disturbance light component is subtracted from histogram in bin range corresponding to reference light reception component in histogram Fmax2: count value of maximum bin after reference light reception component is subtracted from histogram In a case where a peak of a light emission waveform of the light emitting element 3 uniformly has a width equal to or greater than twice a bin width, a count value of the peak does not change wherever the peak of the light emission waveform of the light emitting element 3 is. Therefore, when it is premised that the light emission waveform of the light emitting element 3 is rectangular, the value obtained from the formula (2) corresponds to a light reception pulse width when a bin width is 1. In FIG. 7, computation of the value obtained from the formula (2) is referred to as "normalization".

Figure 8:
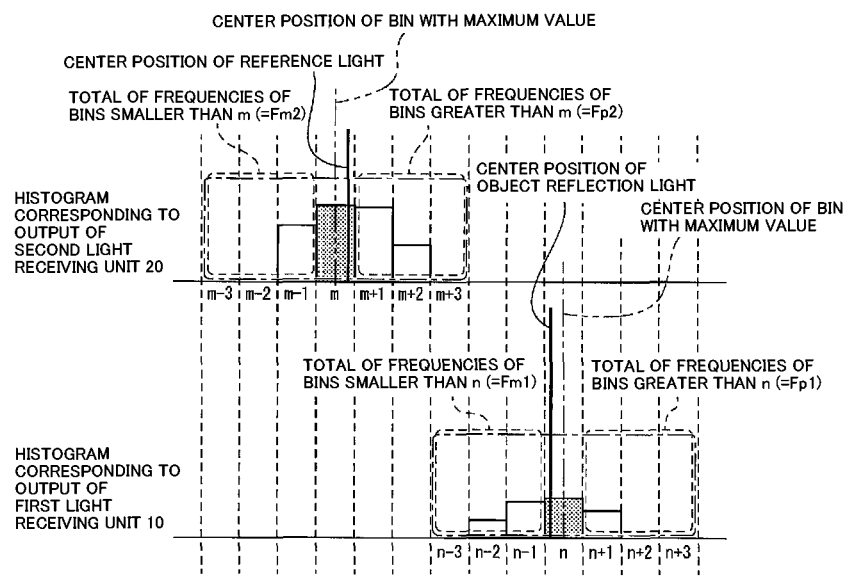
FIG. 8 illustrates a histogram at a time of computation.

Next, the computation unit 30 acquires an average value of distribution of light reception probability of the second light receiving unit 20 (S40). A method for acquiring the average value of the distribution of the light reception probability of the second light receiving unit 20 will be described with reference to FIG. 8. FIG. 8 illustrates a histogram at a time of computation. "Histogram corresponding to output of second light receiving unit 20" of FIG. 8 is a view in which the computation range (range of bins 0 to 6) is replaced with a region of m−3 to m+3 when a bin with a maximum value is m.

First, the computation unit 30 sets a center position of the bin with the maximum value to m+0.5. It is assumed that a total value of count values of bins greater than m is Fp2, a total value of count values of bins smaller than m is Fm2, and a total of count values of bins in the region of m−3 to m+3 is F2. At this time, the computation unit 30 computes a center position of reference light by the following formula (3).

Here, the center position of the reference light may be referred to as the "average value (average position) of distribution of light reception probability of second light receiving unit 20". Alternatively, the center position of the reference light may include a concept wider than that of the average value (average position) of the distribution of the light reception probability of the second light receiving unit 20. Specifically, the center position of the maximum bin is defined as "m+0.5" in the formula (3). This intends to more correctly derive the average value of the distribution of the light reception probability of the second light receiving unit 20. Note that, for example, the center position of the maximum bin may be defined as "m", and also in this case, the computation unit 30 is able to compute the "center position of reference light" by using the formula (3) in which "m+0.5" has been replaced with "m".

[Mathematical formula 1]

$$m + 0.5 + \frac{F2}{2*Fmax2}\left(\frac{Fp2 - Fm2}{F2}\right) \quad (3)$$

m+0.5: center position of maximum bin

F2: total value of count values in m−3 to m+3 (total value of count values after disturbance light component is subtracted from histogram in bin range corresponding to reference light reception component in histogram)

Fmax2: count value of bin m (count value of maximum bin m after reference light reception component is subtracted from histogram)

Fp2: total value of count values of bins greater than m (total value of count values of bins greater than m after disturbance light component is subtracted from histogram)

Fm2: total value of count values of bins smaller than m (total value of count values of bins smaller than m after disturbance light component is subtracted from histogram)

Since a range where pulse light exists is recognized as a range of three or more bins in FIG. 8, the computation unit 30 specifies a range of seven bins including the maximum bin, in which the pulse light is included in any state, as the computation range. In order for the computation unit 30 to measure the distance between the light sensor 100 and the sensing object S with high resolution, the entire reference light reception component is preferably included in the bin range corresponding to the object reflection light component in the histogram. However, without limitation thereto, the computation unit 30 may appropriately set a computation range.

Next, S50 will be described with reference to FIG. 6. The computation unit 30 specifies a crosstalk region in the histogram of the first light receiving unit 10. In an example of FIG. 6, the crosstalk region is a range of bins 2 to 5. The computation unit 30 subtracts the crosstalk component in the bins 2 to 5 from the histogram of the first light receiving unit 10 (S50). The histogram in which the crosstalk component is subtracted is indicated in "histogram corresponding to output of first light receiving unit 10" of FIG. 6.

Note that, the computation unit 30 may subtract a value greater than the actual crosstalk component from the histogram of the first light receiving unit 10 at S50. In this case, at S60, the computation unit 30 is able to search for the maximum bin in which the effect of the crosstalk component is further suppressed. Specifically, in a case where the sensing object S is at a position near the light sensor 100, the reflection light component increases. Thus, in a case where a subtraction value of the crosstalk component is appropriate, even when the object reflection light component and the crosstalk component are overlapped, the maximum bin is able to be detected without problems.

Next, the computation unit 30 searches the histogram of the first light receiving unit 10 for the maximum bin in which the effect of the crosstalk component is suppressed (S60). In FIG. 6, the bin with the maximum value in the histogram of the first light receiving unit 10 is 9. Thus, the computation unit 30 searches that the maximum bin in the histogram of the first light receiving unit 10 is 9 from the histogram of the first light receiving unit 10.

Next, the computation unit 30 creates a histogram by subtracting the dark noise and the disturbance light component from the histogram of FIG. 6 (S70). The histogram obtained after the dark noise and the disturbance light component are subtracted from the "histogram corresponding to output of first light receiving unit 10" of FIG. 6 is described in FIG. 7.

Subsequently, the computation unit 30 acquires an average value of distribution of light reception probability of the first light receiving unit 10 on the basis of "histogram corresponding to output of first light receiving unit 10" of FIG. 7 (S80). A method for acquiring the average value of the distribution of the light reception probability of the first light receiving unit 10 will be described with reference to FIG. 8. "Histogram corresponding to output of first light receiving unit 10" of FIG. 8 is a view in which the computation range (range of bins 6 to 12) is replaced with a region of n−3 to n+3 when a bin with a maximum value is n.

First, the computation unit 30 sets a center position of the bin with the maximum value to n+0.5. It is assumed that a total value of count values of bins greater than n is Fp1, a total value of count values of bins smaller than n is Fm1, and a total in the region of n−3 to n+3 is F1. At this time, the computation unit 30 computes a center position of reflection light by the following formula (4). For example, in a case where the distance between the sensing object S and the light sensor 100 is long, however, a normalization value in Fmax1 may be reduced. In such a case, an error becomes great.

Thus, normalization is suitably performed by using the value obtained from the formula (2).

Here, the center position of the reflection light may be referred to as the "average value (average position) of distribution of light reception probability of first light receiving unit 10". Alternatively, the center position of the reflection light may include a concept wider than that of the average value (average position) of the distribution of the tight reception probability of the first light receiving unit 10. Specifically, the center position of the maximum bin is defined as "n+0.5" in the formula (4), This intends to more correctly derive the average value of the distribution of the light reception probability of the first light receiving unit 10. Note that, for example, when the center position of the maximum bin in the histogram corresponding to the output of the second light receiving unit 20 is defined as "m" in the formula (3), the center position of the maximum bin in the histogram corresponding to the output of the first light receiving unit 10 may 'be defined as "n" also in the formula (4). In this case as well, the computation unit 30 sets "n+0.5".

[Mathematical formula 2]

$$n + 0.5 + \frac{F2}{2*Fmax2}\left(\frac{Fp1 - Fm1}{F1}\right) \quad (4)$$

n+0.5: center position of bin with maximum value

F1: total value of count values in n−3 to n+3 (total value of count values after crosstalk component and disturbance light component are subtracted from histogram in bin range corresponding to object reflection light component in histogram)

Fmax2: count value of bin m (count value of maximum bin m after reference light reception component is subtracted from histogram)

Fp1: total value of count values of bins greater than n (total value of count values of bins greater than n after crosstalk component and disturbance light component are subtracted from histogram)

Fm1: total value of count values of bins smaller than n (total value of count values of bins smaller than n after crosstalk component and disturbance light component are subtracted from histogram)

Since a range where pulse light exists is recognized as a range of three or more bins in FIG. 8, the computation unit 30 specifies a range of seven bins including the bin with the maximum value, in which the pulse light is included in any state, as the computation range. In order for the computation unit 30 to measure the distance between the light sensor 100 and the sensing object S with high resolution, the entire object reflection light component is preferably included in the bin range corresponding to the object reflection light component in the histogram. However, without limitation thereto, the computation unit 30 may appropriately set a computation range.

In a case where a value greater than the actual crosstalk component is subtracted from the histogram of the first light receiving unit 10 at S50, the computation of the formula (4) is performed after restoring a redundantly subtracted value.

Subsequently, as indicated in the following formula (5), the computation unit 30 computes a difference between the average value of the distribution of the light reception probability of the first light receiving unit 10 acquired at S80 and the average value of the distribution of the light reception probability of the second light receiving unit 20 acquired at S40.

[Mathematical formula 3]

$$n - m + \frac{F2}{2*Fmax2}\left(\frac{Fp1 - Fm1}{F1} - \frac{Fp2 - Fm2}{F2}\right) \quad (5)$$

The computation unit 30 computes a delay difference between the reference light and the reflection light by the sensing object S from the result of the formula (5) and proportionally calculates a value obtained through the computation to thereby compute the distance between the light sensor 100 and the sensing object S (S90: computation step). The proportional calculation is performed as follows. For example, a relationship between the delay difference between the reference light and the reflection light by the sensing object S and the distance between the light sensor 100 and the sensing object S is stored in advance in a storage unit (not illustrated). After computing the delay difference between the reference light and the reflection light by the sensing object S, the computation unit 30 reads the distance between the light sensor 100 and the sensing object S, which corresponds to the delay difference obtained through the computation, from the storage unit. As a result, the light sensor 100 is able to measure the distance between the light sensor 100 and the sensing object S.

Note that, description has been given in FIG. 5 by assuming that S50 to S80 are performed after S10 to S40. However, S10 to S40 may be performed after S50 to S80 or at the same time with S50 to S80.

The light sensor 100 exerts the following effect by including the aforementioned configuration.

Specifically, in the light sensor 100, the dark noise and the disturbance light component are subtracted from the histogram of the second light receiving unit 20 and the crosstalk component, the dark noise, and the disturbance light component are subtracted from the histogram of the first light receiving unit 10. That is, the light sensor 100 is able to measure the distance between the light sensor 100 and the sensing object S while suppressing effects of the crosstalk component, the dark noise, and the disturbance light component.

Further, the light sensor 100 acquires the distance between the light sensor 100 and the sensing object S by computation, so that even when the resolution of the first TDC 11 and the second TDC 21 is low, the light sensor 100 is able to measure the distance between the light sensor 100 and the sensing object S with high resolution.

Additionally, to measure the distance between the light sensor 100 and the sensing object S, the light sensor 100 performs computation based on a histogram. Thus, the light sensor 100 does not require a convergence time as in the method for estimating the delay amount by the DLL. As a result, the light sensor 100 is able to measure the distance between the light sensor 100 and the sensing object S at higher speed than the method for estimating the delay amount by the DLL.

In this manner, by including the aforementioned configuration, the light sensor 100 is able to measure a distance with high resolution and at high speed while suppressing the effect of the crosstalk component. Additionally, the light sensor 100 is configured to measure the distance between the light sensor 100 and the sensing object S through computation processing by the computation unit 30 and is thus able to inexpensively achieve various effects described above.

Embodiment 2

A light sensor 120 according to Embodiment 2 of the invention will be described as follows. Note that, for convenience of description, a member having the same function as that of the member described in the aforementioned embodiment will be given the same reference sign and description thereof will be omitted.

Similarly to the light sensor 100, the light sensor 120 includes the reference pulse generation circuit 1, the driver 2, the light emitting element 3, the first light receiving unit 10, the first TDC 11, the first histogram generation circuit 12, the second light receiving unit 20, the second TDC 21, the second histogram generation circuit 22, and the computation unit 30.

However, the light sensor 120 is different from the light sensor 100 in that the computation unit 30 performs filtering processing before S10 and S60 of FIG. 5. Specific description thereof will be given below.

In the light sensor 120, the computation unit 30 acquires a histogram from the second histogram generation circuit 22. Then, the computation unit 30 computes a movement average of a bin region which is a computation region. In the example of the "histogram corresponding to output of second light receiving unit 20" of FIG. 6, a width of pulse light corresponds to almost three bins. Then, the computation unit 30 computes a movement average of three regions in a range of bins 0 to 7 and creates a new histogram on the basis of the movement average. Subsequent steps S10 to S40 may be similar to those in the light sensor 100.

Here, in the description described above, since the width of pulse light corresponds to almost three bins, the computation unit 30 computes the movement average of three regions in the range of bins 0 to 7. Note that, the computation unit 30 may compute a movement average of four regions in the range of bins 0 to 7. In this manner, upon acquisition of the histogram from the first histogram generation circuit 12, the computation unit 30 may compute a movement average of regions with the number substantially matching the number of bins corresponding to reference light in the histogram.

Further, in the description described above, since the width of pulse light corresponds to almost three bins, the computation unit 30 computes the movement average of three regions in the range of bins 0 to 7. Note that, the computation unit 30 may compute a movement average in a range of bins 0 to 12 even though a computation load increases.

In the light sensor 120, the computation unit 30 subtracts the crosstalk component in the computation range (bins 2 to 5 in the example of FIG. 6) from the histogram of the first light receiving unit 10 (S50). Then, the procedure shifts to S60. The computation unit 30 computes a movement average of the entire histogram (bins 0 to 12). In the example of the "histogram corresponding output of first light receiving unit 10" of FIG. 6, the width of pulse light corresponds to almost three bins. Then, the computation unit 30 computes a movement average of three regions in a range of bins 0 to 12 and creates a new histogram on the basis of the movement average. Subsequent steps S60 to S90 may be similar to those in the light sensor 100.

Here, in the description described above, since the width of pulse light corresponds to almost three bins, the computation unit 30 computes the movement average of three regions in the range of bins 0 to 12. Note that, the computation unit 30 may compute a movement average of four regions in the range of bins 0 to 12. Upon acquisition of the histogram from the second histogram generation circuit 22, the computation unit 30 may compute a movement average of regions with the number substantially matching the number of bins corresponding to reflection light (pulse light) by the sensing object S in the histogram.

In this manner, the light sensor 120 performs filtering processing for the histogram before searching for the maximum bin at S10 and S60. Then, on the basis of the average value of the distribution of the light reception probability of the second light receiving unit 20 after the movement average is computed and the average value of the distribution of the light reception probability of the first light receiving unit 10 after the movement average is computed, the computation unit 30 computes a distance between the light sensor 120 and the sensing object S (S90).

According to the aforementioned configuration, in the light sensor 120, the maximum value of the bin is emphasized by filtering processing so that the bin with the maximum value is easily searched for correctly. Further, the light sensor 120 is able to more correctly measure the distance between the light sensor 120 and the sensing object S while suppressing an effect by noise through smoothing processing by a movement average.

Embodiment 3

A light sensor 130 according to Embodiment 3 of the invention will be described as follows. Note that, for convenience of description, a member having the same function as that of the member described in the aforementioned embodiment will be given the same reference sign and description thereof will be omitted.

Similarly to the light sensor 100, the light sensor 130 includes the reference pulse generation circuit 1, the driver 2, the light emitting element 3, the first light receiving unit 10, the first TDC 11, the first histogram generation circuit 12, the second light receiving unit 20, the second TDC 21, the second histogram generation circuit 22, and the computation unit 30.

However, in the light sensor 130, the computation unit 30 performs S20 and S70 of FIG. 5 in a different manner from that in the light sensor 100. Specific description thereof will be given below with reference to FIG. 9.

Figure 9:
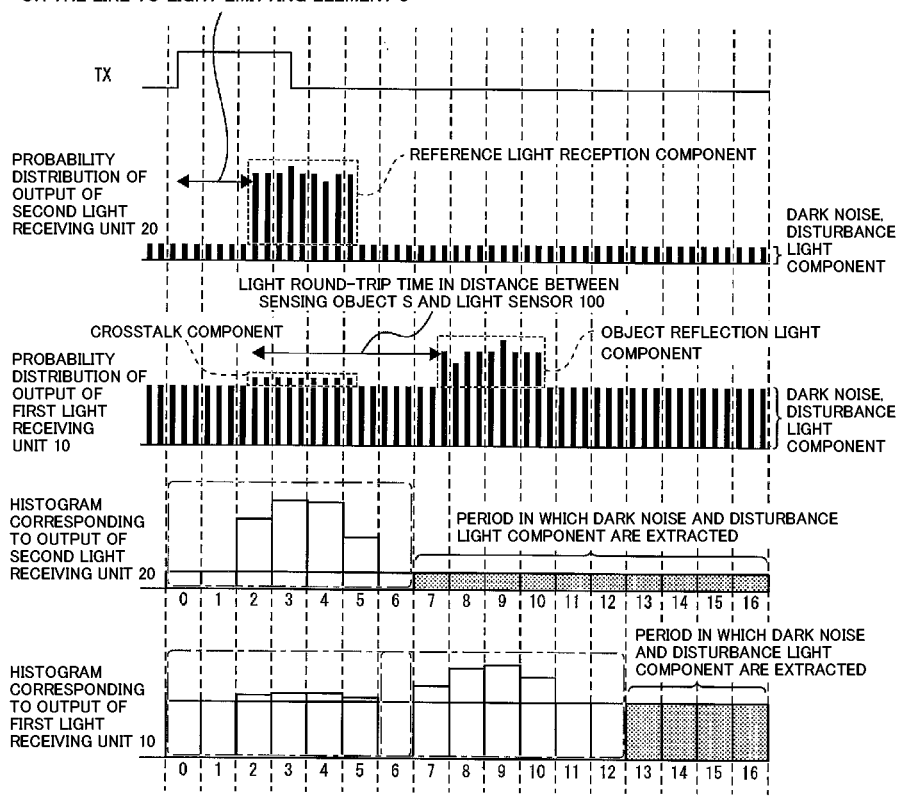
FIG. 9 is a view for explaining how to subtract dark noise and a disturbance light component.

FIG. 9 is a view for explaining how to subtract dark noise and a disturbance light component. FIG. 9 indicates "TX", "probability distribution of output of second light receiving unit 20", "probability distribution of output of first light receiving unit 10", "histogram corresponding to output of second light receiving unit 20", and "histogram corresponding to output of first light receiving unit 10" from the top.

In the light sensor 130, the computation unit 30 computes a subtraction value of the dark noise and the disturbance light component by using an average value of count values of the histogram in a range (bins 7 to 16) other than the computation range in the second light receiving unit 20 (corresponding to S20). Further, in the light sensor 130, the computation unit 30 computes a subtraction value of the dark noise and the disturbance light component by using an average value of count values of the histogram of bins (bins 13 to 16) except for the computation range (bins 7 to 12) and a crosstalk generation region (bins 0 to 6) in the first light receiving unit 10 (corresponding to S70).

According to the aforementioned configuration, the light sensor 130 does not need to separately provide a non-light emission time of the light emitting element 3. As a result, the light sensor 130 is able to measure a distance between the light sensor 130 and the sensing object S at higher speed than the light sensor 100 measures the distance between the light sensor 100 and the sensing object S.

Embodiment 4

A light sensor 140 according to Embodiment 4 of the invention will be described as follows. Note that, for convenience of description, a member having the same function as that of the member described in the aforementioned embodiment will be given the same reference sign and description thereof will be omitted.

The light sensor 140 is used when a distance from each of the first light receiving unit 10 and the second light receiving unit 20 to the cover glass G is sufficiently short in the configuration of FIG. 1. Specific description thereof will be given below.

As described above, in the light sensor 100, the computation unit 30 subtracts the crosstalk component in the computation range (bins 2 to 5 in the example of FIG. 6) from the histogram of the first light receiving unit 10 (S50). On the other hand, in the light sensor 140, the crosstalk component of each of bins to be subtracted from the histogram of the first light receiving unit 10 is set as a value obtained by multiplying a value of each of bins in the computation range (bins 2 to 5 in the example of FIG. 6) of the histogram of the second light receiving unit 20 by a fixed value. Specifically, in the light sensor 140, the crosstalk component in the bin 2 to be subtracted from the histogram of the first light receiving unit 10 is set as a value obtained by multiplying a value of the bin 2 of the histogram of the second light receiving unit 20 by the fixed value. Further, in the light sensor 140, the crosstalk component in the bin 3 to be subtracted from the histogram of the first light receiving unit 10 is set as a value obtained by multiplying a value of the bin 3 of the histogram of the second light receiving unit 20 by the fixed value. In this manner, for each of the bins of the histogram of the second light receiving unit 20, a different subtraction value is given as the crosstalk component of each of the bins to be subtracted from the histogram of the first light receiving unit 10. The "fixed value" may be appropriately set as, for example, 1.5, 2, or the like. The light sensor 140 uses not a variable value but the fixed value to thereby improve reliability of a computation result.

According to the aforementioned configuration, even under an environment (for example, when there is a temperature change) where photon detection probability of the first light receiving unit 10 and the second light receiving unit 20 changes at the same time, the light sensor 140 is able to cause the subtraction value of the crosstalk component to be subtracted from the histogram of the first light receiving unit 10 to automatically follow a normal value. As a result, the light sensor 140 is able to suitably measure the distance between the light sensor 140 and the sensing object S.

Embodiment 5

A light sensor 150 according to Embodiment 5 of the invention will be described as follows. Note that, for convenience of description, a member having the same function as that of the member described in the aforementioned embodiment will be given the same reference sign and description thereof will be omitted.

Similarly to the light sensor 100, the light sensor 150 includes the reference pulse generation circuit 1, the driver 2, the light emitting element 3, the first light receiving unit 10, the first TDC 11, the first histogram generation circuit 12, the second light receiving unit 20, the second TDC 21, the second histogram generation circuit 22, and the computation unit 30.

However, the light sensor 150 is different from the light sensor 100 in that the computation unit 30 automatically updates the subtraction value of the crosstalk component. Specific description thereof will be given below with reference to FIGS. 10 and 11.

Figure 10:
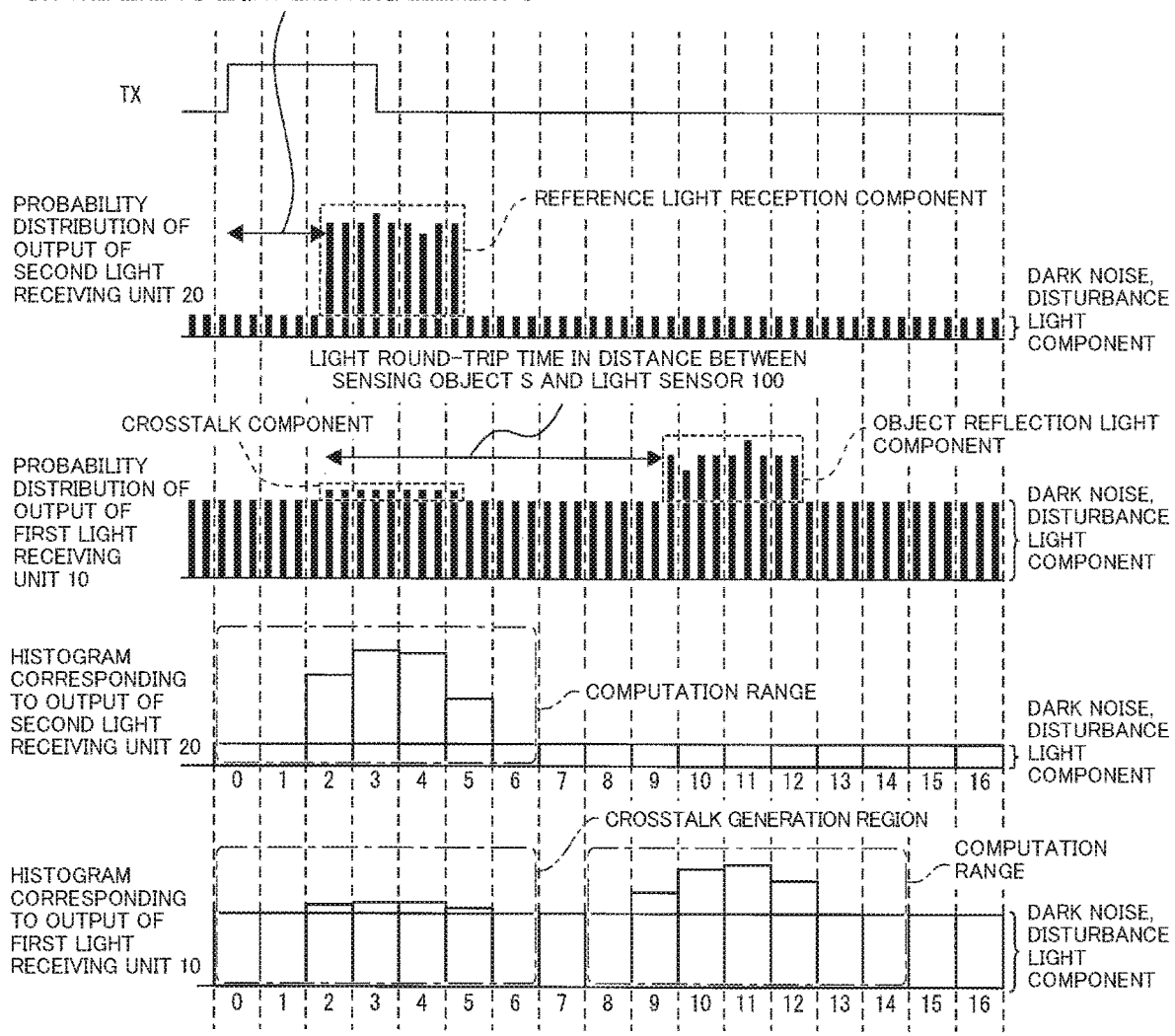
FIG. 10 illustrates an example of histograms generated by the first histogram generation circuit and the second histogram generation circuit.

FIG. 10 illustrates an example of histograms generated by the first histogram generation circuit 12 and the second histogram generation circuit 22. The example of FIG. 10 indicates a histogram of bins 0 to 16.

By referring to "histogram corresponding to output of first light receiving unit 10" of FIG. 10, the computation unit 30 specifies bins 0 to 6 as a crosstalk generation region and bins 8 to 14 as a computation range. That is, the crosstalk generation region and the computation range are not overlapped with each other in FIG. 10. In such a case, the computation unit 30 removes the disturbance light component from the histogram of the crosstalk generation region and extracts the crosstalk component from the histogram from which the disturbance light component has been removed. The computation unit 30 then sets the extracted crosstalk component as the crosstalk component (crosstalk subtraction value) to be subtracted from the histogram of the first light receiving unit 10 at S50 of FIG. 5.

Figure 11:
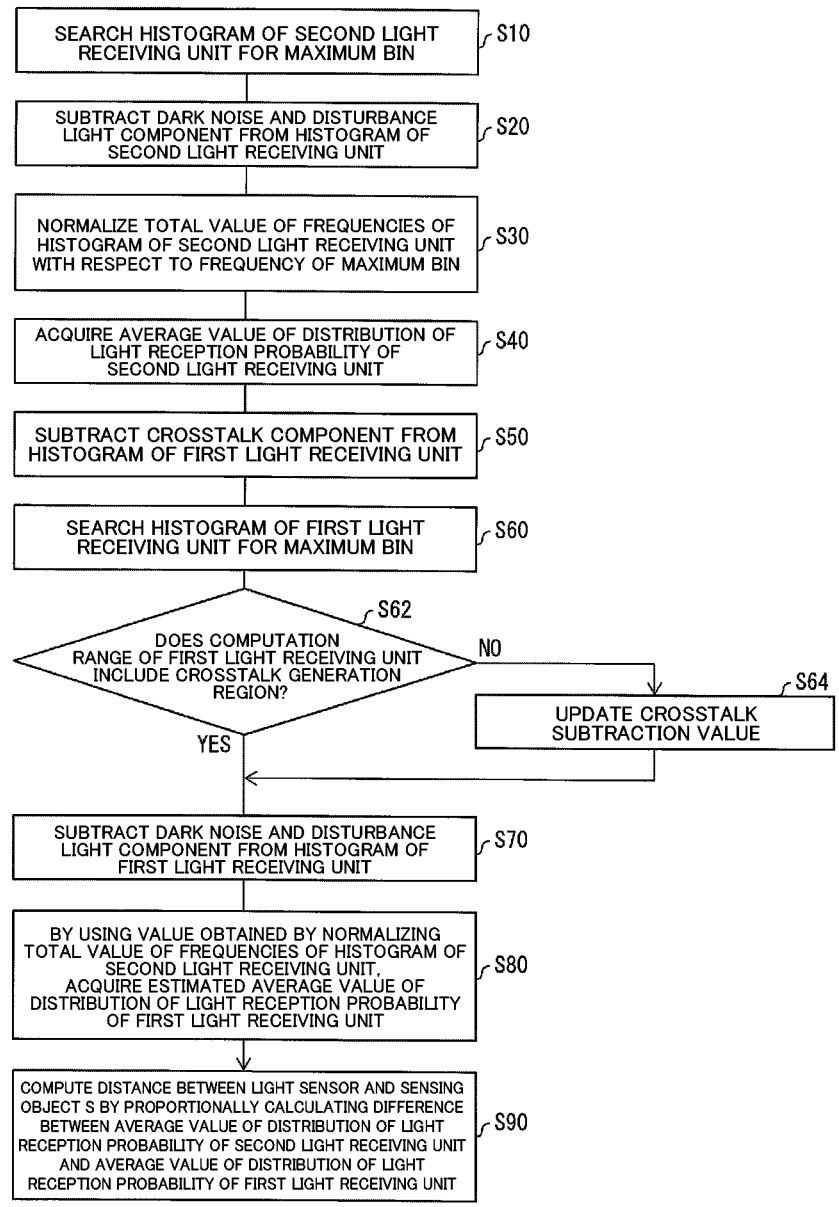
FIG. 11 is a flowchart illustrating a flow in which the computation unit computes a distance between the sensing object S and a light sensor according to another embodiment of the invention.

Specific description thereof will be given below with reference to FIG. 11. FIG. 11 is a flowchart illustrating a flow in which the computation unit 30 computes a distance between the sensing object S and the light sensor 150. Note that, since S10 to S60 and S70 to S90 are the same as those in the flow of FIG. 5, description thereof will be omitted.

The computation unit 30 searches the histogram of the first light receiving unit 10 for the maximum bin in which the effect of the crosstalk component is suppressed (S60). Then, the computation unit 30 checks whether the crosstalk generation region and the computation range are overlapped with each other in the histogram corresponding to the output of the first light receiving unit 10 (S62).

When "Yes" is given at S62, the computation unit 30 creates a histogram by subtracting the dark noise and the disturbance light component from the histogram of FIG. 6 (S70). On the other hand, when "No" is given at S62, the computation unit 30 removes the disturbance light component from the crosstalk generation region and extracts the crosstalk subtraction value from the histogram from which the disturbance light component has been removed. The computation unit 30 then sets (updates) the extracted crosstalk subtraction value as the crosstalk subtraction value to be subtracted from the histogram of the first light receiving unit 10 at S50 of FIG. 5 (S64). Subsequently, the computation unit 30 shifts to processing of S70. In the light sensor 150, when the computation unit 30 updates the crosstalk subtraction value at S64, the updated crosstalk subtraction value is used in next processing of S50.

According to the aforementioned configuration, the light sensor 150 does not need to cause the computation unit 30 to compute the crosstalk subtraction value every time and is thus able to compute the distance between the light sensor 150 and the sensing object S at high speed.

Here, in a case where the disturbance light component is great and the object reflection light component is small, the computation range may be incorrect. Thus, in particular, in a case where a value of the maximum bin in the first light receiving unit 10 after the disturbance light component is subtracted is equal to or more than a predetermined threshold, the computation unit 30 extracts the crosstalk component at that time. The computation unit 30 then updates the extracted crosstalk component as the crosstalk subtraction value (S64). As a result, even in a case where the disturbance light component is great and the object reflection light component is small, the light sensor 150 is able to correctly compute the distance between the light sensor 150 and the sensing object S.

Note that, the crosstalk subtraction value updated for each bin may be a measurement value (count value of the extracted crosstalk component) itself or a value obtained by multiplying the crosstalk subtraction value by a fixed value as in Embodiment 4. In any case, on the basis of the count value of each bin in a bin range corresponding to the crosstalk component, the computation unit 30 defines the crosstalk subtraction value of each bin in the bin range.

According to the aforementioned configuration, even when the crosstalk component is not measured stably, for example, because of contamination or the like being attached to the cover glass G, the light sensor 150 is able to correctly compute the distance between the sensing object S and the light sensor 150.

Note that, the computation unit 30 may automatically update the subtraction value of the crosstalk component as described below.

Specifically, the computation unit 30 records an average value of count values of one or more bins corresponding to the crosstalk component. Then, the computation unit 30 subtracts a value equal to or more than the average value as the crosstalk component from the object reflection light component, and after that, searches for the maximum bin (S60).

In this manner, the computation unit 30 is able to automatically update the subtraction value of the crosstalk component in various manners.

Embodiment 6

A light sensor 160 according to Embodiment 6 of the invention will be described as follows. Note that, for convenience of description, a member having the same function as that of the member described in the aforementioned embodiment will be given the same reference sign and description thereof will be omitted.

Figure 12:
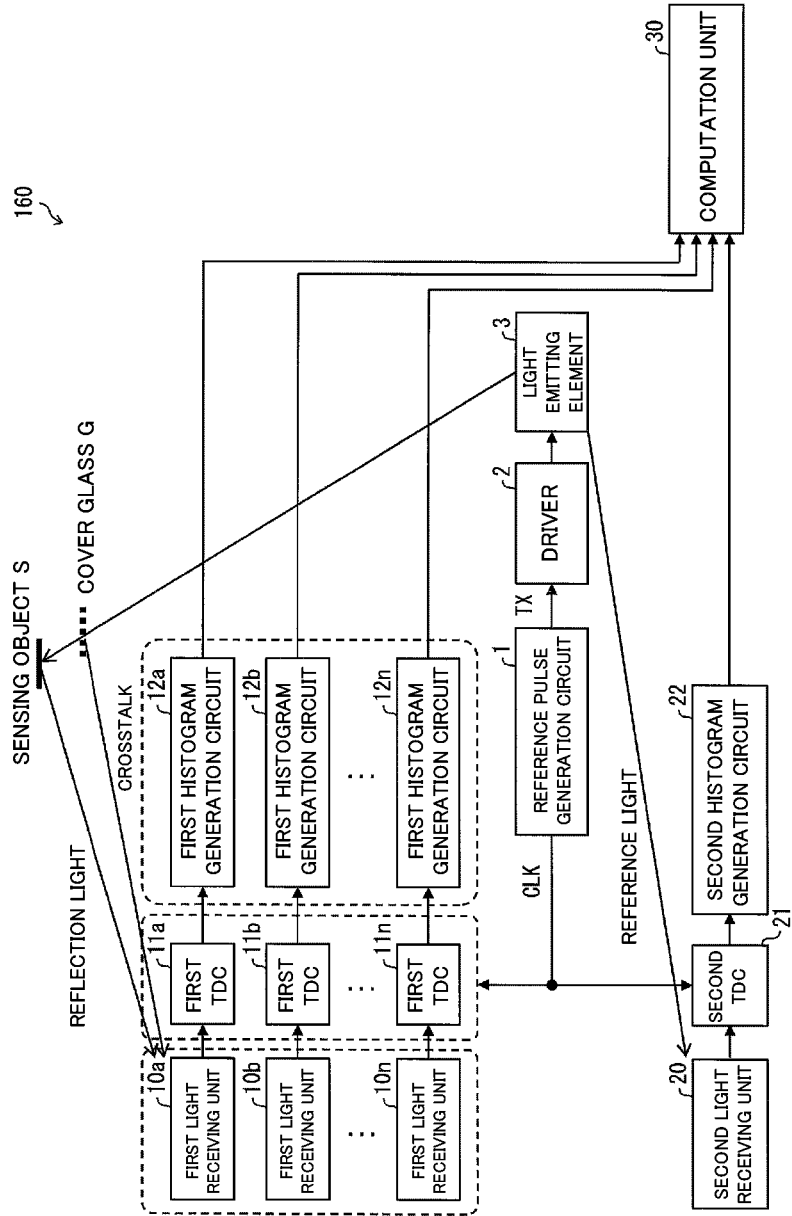
FIG. 12 is a block diagram illustrating a schematic configuration of a light sensor according to still another embodiment of the invention that includes a light emitting element, a plurality of first light receiving units, and a plurality of first TDCs.

FIG. 12 is a block diagram illustrating a schematic configuration of the light sensor 160 including the light emitting element 3, a plurality of first light receiving units 10, and a plurality of first TDCs 11.

Similarly to the light sensor 100, the light sensor 160 includes the reference pulse generation circuit 1, the driver 2, the light emitting element 3, the first light receiving unit 10, the first TDC 11, the first histogram generation circuit 12, the second light receiving unit 20, the second TDC 21, the second histogram generation circuit 22, and the computation unit 30. However, the light sensor 160 includes a plurality of sets of the first light receiving unit 10, the first TDC 11, and the first histogram generation circuit 12. The computation unit 30 performs computation processing in a manner as described above for all histograms output from a plurality of first histogram generation circuits 12 and computes a distance between the sensing object S and the light sensor 160.

According to the aforementioned configuration, the light sensor 160 includes a plurality of pixels. Thereby, the light sensor 160 is suitably applicable to a 3D (3-Dimension)-TOF (TOF: Time Of Flight) distance measurement sensor for AF or the like.

[Example of Realization by Software]

The computation unit 30 may be realized by a logic circuit (hardware) provided in an integrated circuit (IC chip) or the like or may be realized by software with use of a CPU (Central Processing Unit).

In the latter case, the computation unit 30 includes a CPU that executes a command of a program that is software enabling each of functions, a ROM (Read Only Memory) or a storage device (each referred to as a "recording medium") in which the program and various kinds of data are recorded so as to be readable by a computer (or a CPU), a RAM (Random Access Memory) that develops the program, and the like. An object of the invention is achieved by a computer (or a CPU) reading and executing the program from the recording medium. As the recording medium, for example, a "non-transitory tangible medium" such as a tape, a disk, a card, a semiconductor memory, or a programmable logic circuit is able to be used. The program may be supplied to the computer via any transmission medium (such as a communication network or a broadcast wave) which allows the program to be transmitted. Note that, an aspect of the invention can also be achieved in a form of a data signal in which the program is embodied through electronic transmission and which is embedded in a carrier wave.

CONCLUSION

A light sensor according to an aspect 1 of the invention is a light sensor that measures a distance to a sensing object, and includes: a light emitting element that radiates pulse light to the sensing object; one or more first light receiving units of a photon count-type that output a first pulse synchronized with incidence of a photon by at least one of reflection light by the sensing object, first disturbance light, and reflection light by an inside of the light sensor; one or more first histogram generation units that generate a first histogram indicating a relationship between an output time and a pulse frequency of the first pulse; a second light receiving unit of a photon count-type that outputs a second pulse synchronized with incidence of a photon by at least any of second disturbance light and reference light from the light emitting element; a second histogram generation unit that generates a second histogram indicating a relationship between an output time and a pulse frequency of the second pulse; and a computation unit that computes the distance between the light sensor and the sensing object on a basis of a difference between a center position of reflection light, which indicates a center position of distribution of light reception probability of the first light receiving unit in the first histogram, and a center position of reference light, which indicates a center position of distribution of light reception probability of the second light receiving unit in the second histogram, in which a component corresponding to the reflection light by the sensing object is an object reflection light component, a component corresponding to the first disturbance light is a first disturbance light component, a component corresponding to the reflection light by the inside of the light sensor is a crosstalk component in the first histogram, and a component corresponding to the reference light from the light emitting element is a reference light reception component and a component corresponding to the second disturbance light is a second disturbance light component in the second histogram.

According to the aforementioned configuration, the light sensor according to the aspect of the invention measures the distance between the light sensor and the sensing object through computation processing. As a result, the light sensor according to the aspect of the invention is able to improve a time required to measure the distance between the light sensor and the sensing object.

Moreover, the light sensor according to the aspect of the invention computes the distance between the light sensor and the sensing object by considering the crosstalk component, the first disturbance light component, and the second disturbance light component. As a result, the light sensor according to the aspect of the invention is able to measure the distance between the light sensor and the sensing object with high resolution.

Further, the light sensor according to the aspect of the invention does not need a delay locked loop circuit (DLL) differently from a method for estimating a delay amount by the DLL. Accordingly, the light sensor according to the aspect of the invention is able to measure the distance between the light sensor and the sensing object by a more inexpensive configuration than a conventional configuration.

The light sensor according to an aspect 2 of the invention may have a configuration in which the computation unit computes the difference between the center position of the reflection light and the center position of the reference light by a following formula, in the aspect 1.

$$n - m + \frac{F2}{2 * Fmax2}\left(\frac{Fp1 - Fm1}{F1} - \frac{Fp2 - Fm2}{F2}\right) \quad \text{[Mathematical formula 4]}$$

In the formula, n is a bin (maximum bin) whose count value after the crosstalk component is subtracted from the first histogram is maximum, F1 is a total value of count values after the crosstalk component and the first disturbance light component are subtracted from the first histogram in a bin range corresponding to the object reflection light component in the first histogram, Fp1 is a total value of count values of a bin greater than n after the crosstalk component and the first disturbance light component are subtracted from the first histogram, Fm1 is a total value of count values of a bin smaller than n after the crosstalk component and the first disturbance light component are subtracted from the first histogram, m is a bin (maximum bin) whose count value is maximum in the second histogram, F2 is a total value of count values after the second disturbance light component is subtracted from the second histogram in a bin range corresponding to the reference light reception component in the second histogram, Fmax2 is a count value of the maximum bin m after the reference light reception component is subtracted from the second histogram, Fp2 is a total value of count values of a bin greater than m after the second disturbance light component is subtracted from the second histogram, and Fm2 is a total value of count values of a bin smaller than m after the second disturbance light component is subtracted from the second histogram.

According to the aforementioned configuration, the light sensor according to the aspect of the invention does not need a complicated computation formula to compute (measure) the distance between the light sensor and the sensing object.

As a result, the light sensor according to the aspect of the invention is able to measure the distance between the light sensor and the sensing object with a reduced computation load on the computation unit and in a short time.

The light sensor according to an aspect 3 of the invention may have a configuration in which the bin range corresponding to the object reflection light component in the first histogram includes the entire object reflection light component, and the bin range corresponding to the reference light reception component in the second histogram includes the entire reference light reception component, in the aspect 2.

According to the aforementioned configuration, the light sensor according to the aspect of the invention is able to measure the distance between the light sensor and the sensing object with higher resolution.

The light sensor according to an aspect 4 of the invention may have a configuration in which the computation unit subtracts the crosstalk component from the first histogram and subsequently computes a movement average of count values of bins of the first histogram by the number substantially the same as the number of bins corresponding to the object reflection light component in the first histogram, and then, searches for the maximum bin (n), and computes a movement average of count values of bins of the second histogram by the number substantially the same as the number of bins corresponding to the reference light reception component in the second histogram, and then, searches for the maximum bin (m), in the aspect 2 or 3.

The light sensor according to an aspect 4 of the invention may have a configuration in which the computation unit searches for the maximum bin (n) after performing filtering for the first histogram by the number of bins corresponding to a width of the pulse light and searches for the maximum bin (m) after performing filtering for the second histogram by the number of bins corresponding to the width of the pulse light, in the aspect 2 or 3.

According to the aforementioned configuration, the light sensor according to the aspect of the invention is able to emphasize the maximum bin by filtering (movement average processing) and correctly search for the maximum bin. The light sensor according to the aspect of the invention is able to more correctly measure the distance between the light sensor and the sensing object while suppressing an effect by noise through filtering.

The light sensor according to an aspect 5 of the invention may have a configuration in which the computation unit records an average value of count values of one or more bins corresponding to the crosstalk component, subtracts a value equal to or more than the average value from the object reflection light component as the crosstalk component, and then searches for the maximum bin (n), in the aspect 2 or 3.

According to the aforementioned configuration, even in a case where an ambient environment (such as temperature) changes, the light sensor according to the aspect of the invention is able to compute the distance between the light sensor and the sensing object by considering the crosstalk component.

The light sensor according to an aspect 6 of the invention may have a configuration in which the computation unit defines, as the first disturbance light component, an average value of count values of one or more bins in a bin range other than a bin range corresponding to the crosstalk component or the object reflection light component in the first histogram, defines, as the second disturbance light component, an average value of count values of one or more bins in a bin range other than the bin range corresponding to the reference light reception component in the second histogram, and computes the difference between the center position of the reflection light and the center position of the reference light, in any one of the aspects 2 to 5.

According to the aforementioned configuration, the light sensor according to the aspect of the invention does not need to separately provide a non-light emission time of the light emitting element. As a result, the light sensor according to the aspect of the invention is able to measure the distance between the light sensor and the sensing object at higher speed.

The light sensor according to an aspect 7 of the invention may have a configuration in which when computing the center position of the reflection light, the computation unit defines, as the crosstalk component, a value obtained by multiplying a count value of any one bin of one or more bins corresponding to the reference light reception component in the second histogram by a fixed value and subtracts a crosstalk value thereof from the object reflection light component, in any one of the aspects 2 to 6.

Alternatively, the light sensor according to an aspect 7 of the invention may have a configuration in which the computation unit specifies the bin range corresponding to the reference light reception component in the second histogram as the bin range corresponding to the crosstalk component, defines a value obtained by multiplying a count value of a bin included in the bin range by a fixed value as the crosstalk component of the bin, and subtracts the defined crosstalk component from a count value of a bin of the first histogram corresponding to the bin included in the bin range corresponding to the reference light reception component in the second histogram, in any one of the aspects 2 to 6.

According to the aforementioned configuration, even under an environment (for example, when there is a temperature change) where photon detection probability of the first light receiving unit and the second light receiving unit changes at the same time, the light sensor according to the aspect of the invention is able to cause a subtraction value of the crosstalk component to be subtracted from the first histogram to automatically follow a normal value. As a result, the light sensor according to the aspect of the invention is able to suitably measure the distance between the light sensor and the sensing object.

The light sensor according to an aspect 8 of the invention may have a configuration in which in a case where, in the first histogram, the bin range corresponding to the crosstalk component and the bin range corresponding to the object reflection light component are not overlapped with each other and a value obtained after subtracting the first disturbance light component from a maximum bin of one or more bins corresponding to the object reflection light component is equal to or more than a predetermined value, on a basis of a count value of each of the bins in the bin range corresponding to the crosstalk component, the computation unit defines the crosstalk component of each of the bins in the bin range, in any one of the aspects 2 to 6.

According to the aforementioned configuration, even when the crosstalk component is not measured stably, for example, because of contamination or the like being attached to the inside (such as cover glass) of the light sensor, the light sensor according to the aspect of the invention is able to suitably measure the distance between the light sensor and the sensing object.

The light sensor according to an aspect 9 of the invention may have a configuration in which the first light receiving unit includes a plurality of first light receiving units, the first histogram generation unit includes a plurality of first histogram generation units whose number is the same as the number of the plurality of first light receiving units, the plurality of first light receiving units and the plurality of first histogram generation units have one-to-one correspondence, and the computation unit computes the distance between the light sensor and the sensing object on a basis of a plurality of first histograms generated by the plurality of first histogram generation units and the second histogram, in any one of the aspects 1 to 8.

According to the aforementioned configuration, the light sensor according to the aspect of the invention is able to include a plurality of pixels. Thereby, the light sensor according to the aspect of the invention is suitably applicable to a 3D (3-Dimension)-TOF (TOF: Time Of Flight) distance measurement sensor for AF or the like.

The light sensor according to an aspect 10 of the invention may have a configuration in which a correspondence relationship between the difference between the center position of the reflection light and the center position of the reference light and the distance between the light sensor and the sensing object is defined in advance, and the computation unit computes the distance between the light sensor and the sensing object from the difference between the center position of the reflection light and the center position of the reference light on a basis of the correspondence relationship, in any one of the aspects 1 to 9.

According to the aforementioned configuration, the light sensor according to the aspect of the invention is able to compute the distance between the light sensor and the sensing object at very high speed when the difference between the center position of the reflection light and the center position of the reference light is computed.

An electronic device according to an aspect 11 of the invention that includes the light sensor may be configured to include the light sensor according to any one of the aspects 1 to 10, in any of the aspects 1 to 10.

By including the light sensor, the electronic device according to the aspect of the invention is able to have a function of measuring a distance between the electronic device and the sensing object at high speed and with high resolution.

A computation apparatus according to an aspect 12 of the invention is a computation apparatus applied to a light sensor that measures a distance to a sensing object, in which the light sensor includes: a light emitting element that radiates pulse light to the sensing object; one or more first light receiving units of a photon count-type that output a first pulse synchronized with incidence of a photon by at least one of reflection light by the sensing object, first disturbance light, and reflection light by an inside of the light sensor; and a second light receiving unit of a photon count-type that outputs a second pulse synchronized with incidence of a photon by at least any of second disturbance light and reference light from the light emitting element; and the computation apparatus includes: one or more first histogram generation units that generate a first histogram indicating a relationship between an output time and a pulse frequency of the first pulse; a second histogram generation unit that generates a second histogram indicating a relationship between an output time and a pulse frequency of the second pulse; and a computation unit that computes the distance between the light sensor and the sensing object on a basis of a difference between a center position of reflection light, which indicates a center position of distribution of light reception probability of the first light receiving unit in the first histogram, and a center position of reference light, which indicates a center position of distribution of light reception probability of the second light receiving unit in the second histogram, in which a component corresponding to the reflection light by the sensing object is an object reflection light component, a component corresponding to the first disturbance light is a first disturbance light component, a component corresponding to the reflection light by the inside of the light sensor is a crosstalk component in the first histogram, and a component corresponding to the reference light from the light emitting element is a reference light reception component and a component corresponding to the second disturbance light is a second disturbance light component in the second histogram.

According to the aforementioned configuration, an effect similar to that of the light sensor described above is exerted.

A method according to an aspect 13 of the invention is a method for measuring a distance between a light sensor and a sensing object, and the method includes the steps of: radiating pulse light from a light emitting element included in the light sensor and outputting a first pulse synchronized with incidence of a photon on a first light receiving unit by at least one of reflection light by the sensing object, first disturbance light, and reflection light by an inside of the light sensor; generating a first histogram indicating a relationship between an output time and a pulse frequency of the first pulse; outputting a second pulse synchronized with incidence of a photon on a second light receiving unit by at least any of second disturbance light and reference light from the light emitting element; generating a second histogram indicating a relationship between an output time and a pulse frequency of the second pulse; and computing the distance between the light sensor and the sensing object on a basis of a difference between a center position of reflection light, which indicates a center position of distribution of light reception probability of the first light receiving unit in the first histogram, and a center position of reference light, which indicates a center position of distribution of light reception probability of the second light receiving unit in the second histogram, in which a component corresponding to the reflection light by the sensing object is an object reflection light component, a component corresponding to the first disturbance light is a first disturbance light component, a component corresponding to the reflection light by the inside of the light sensor is a crosstalk component in the first histogram, and a component corresponding to the reference light from the light emitting element is a reference light reception component and a component corresponding to the second disturbance light is a second disturbance light component in the second histogram.

According to the aforementioned configuration, an effect similar to that of the light sensor described above is exerted.

The invention is not limited to each of the embodiments described above, and may be modified in various manners within the scope indicated in the claims and an embodiment achieved by appropriately combining technical means disclosed in different embodiments is also encompassed in the technical scope of the invention. Further, by combining the technical means disclosed in each of the embodiments, a new technical feature may be formed.

REFERENCE SIGNS LIST

1 reference pulse generation circuit
2 driver
3 light emitting element
10 first light receiving unit
11 first TDC
12 first histogram generation circuit (first histogram generation unit)
20 second light receiving unit
21 second TDC
22 second histogram generation circuit (second histogram generation unit)
30 computation unit
100, 110, 120, 130, 140, 150, 160 light sensor

The invention claimed is:

1. A light sensor that measures a distance to a sensing object, the light sensor comprising:
  a light emitting element that radiates pulse light to the sensing object;
  one or more first light receiving units of a photon count-type that output a first pulse synchronized with incidence of a photon by at least one of reflection light by the sensing object, first disturbance light, and reflection light by an inside of the light sensor;
  one or more first histogram generation units that generate a first histogram indicating a relationship between an output time and a pulse frequency of the first pulse;
  a second light receiving unit of a photon count-type that outputs a second pulse synchronized with incidence of a photon by at least any of second disturbance light and reference light from the light emitting element;
  a second histogram generation unit that generates a second histogram indicating a relationship between an output time and a pulse frequency of the second pulse; and
  a computation unit that computes the distance between the light sensor and the sensing object on a basis of a difference between a center position of reflection light, which indicates a center position of distribution of light reception probability of the first light receiving unit in the first histogram, and a center position of reference light, which indicates a center position of distribution of light reception probability of the second light receiving unit in the second histogram, in which a component corresponding to the reflection light by the sensing object is an object reflection light component, a component corresponding to the first disturbance light is a first disturbance light component, a component corresponding to the reflection light by the inside of the light sensor is a crosstalk component in the first histogram, and a component corresponding to the reference light from the light emitting element is a reference light reception component and a component corresponding to the second disturbance light is a second disturbance light component in the second histogram, wherein the computation unit computes the difference between the center position of the reflection light and the center position of the reference light by a following formula:

$$n - m + \frac{F2}{2*Fmax2}\left(\frac{Fp1 - Fm1}{F1} - \frac{Fp2 - Fm2}{F2}\right) \quad \text{[Mathematical formula 4]}$$

where, n is a bin (maximum bin) whose count value after the crosstalk component is subtracted from the first histogram is maximum,
  F1 is a total value of count values after the crosstalk component and the first disturbance light component are subtracted from the first histogram in a bin range corresponding to the object reflection light component in the first histogram,
  Fp1 is a total value of count values of a bin greater than n after the crosstalk component and the first disturbance light component are subtracted from the first histogram, Fm1 is a total value of count values of a bin smaller than n after the crosstalk component and the first disturbance light component are subtracted from the first histogram, m is a bin (maximum bin) whose count value is maximum in the second histogram, F2 is a total value of count values after the second disturbance light component is subtracted from the second histogram in a bin range corresponding to the reference light reception component in the second histogram, Fmax2 is a count value of the maximum bin m after the reference light reception component is subtracted from the second histogram, Fp2 is a total value of count values of a bin greater than m after the second disturbance light component is subtracted from the second histogram, and Fm2 is a total value of count values of a bin smaller than m after the second disturbance light component is subtracted from the second histogram.

2. The light sensor according to claim 1, wherein the bin range corresponding to the object reflection light component in the first histogram includes the entire object reflection light component, and the bin range corresponding to the reference light reception component in the second histogram includes the entire reference light reception component.

3. The light sensor according to claim 1, wherein the computation unit searches for the maximum bin (n) after performing filtering for the first histogram by the number of bins corresponding to a width of the pulse light and searches for the maximum bin (m) after performing filtering for the second histogram by the number of bins corresponding to the width of the pulse ht.

4. The light sensor according to claim 1, wherein the computation unit records an average value of count values of one or more bins corresponding to the crosstalk component, subtracts a value equal to or more than the average value from the object reflection light component as the crosstalk component, and then searches for the maximum bin (n).

5. The light sensor according to claim 1, wherein the computation unit defines, as the first disturbance light component, an average value of count values of one or more bins in a bin range other than a bin range corresponding to the crosstalk component or the object reflection light component in the first histogram, defines, as the second disturbance light component, an average value of count values of one or more bins in a bin range other than the bin range corresponding to the reference light reception component in the second histogram, and computes the difference between the center position of the reflection light and the center position of the reference light.

6. The light sensor according to claim 1, wherein the computation unit specifies the bin range corresponding to the reference light reception component in the second histogram as the bin range corresponding to the crosstalk component, defines a value obtained by multiplying a count value of a bin included in the bin range by a fixed value as the crosstalk component of the bin, and subtracts the defined crosstalk component from a count value of a bin of the first histogram corresponding to the bin included in the bin range corresponding to the reference light reception component in the second histogram.

7. The light sensor according to claim 1, wherein in a case where, in the first histogram, the bin range corresponding to the crosstalk component and the bin range corresponding to the object reflection light component are not overlapped with each other and a value obtained after subtracting the first disturbance light component from a maximum bin of one or more bins corresponding to the object reflection light component is equal to or more than a predetermined value, on a basis of a count value of each of the bins in the bin range corresponding to the crosstalk component, the computation unit defines the crosstalk component of each of the bins in the bin range.

8. The light sensor according to claim 1, wherein a plurality of first light receiving units, the first histogram generation unit includes a plurality of first histogram generation units whose number is the same as the number of the plurality of first light receiving units, the plurality of first light receiving units and the plurality of first histogram generation units have one-to-one correspondence, and the computation unit computes the distance between the light sensor and the sensing object on a basis of a plurality of first histograms generated by the plurality of first histogram generation units and the second histogram.

9. The light sensor according to claim 1, wherein a correspondence relationship between the difference between the center position of the reflection light and the center position of the reference light and the distance between the light sensor and the sensing object is defined in advance, and the computation unit computes the distance between the light sensor and the sensing object from the difference between the center position of the reflection light and the center position of the reference light on a basis of the correspondence relationship.

10. An electronic device comprising the light sensor according to claim 1.

11. A light sensor that measures a distance to a sensing object, the light sensor comprising:

a tight emitting element that radiates pulse light to the sensing object;

one or more first light receiving units of a photon count-type that output a first pulse synchronized with incidence of a photon by at least one of reflection light by the sensing object, first disturbance light, and reflection light by an inside of the light sensor;

one or more first histogram generation units that generate a first histogram indicating a relationship between an output time and a pulse frequency of the first pulse;

a second light receiving unit of a photon count-type that outputs a second pulse synchronized with incidence of a photon by at least any of second disturbance light and reference light from the light emitting element;

a second histogram generation unit that generates a second histogram indicating a relationship between an output time and a pulse frequency of the second pulse; and a computation unit that computes a center position of reflection tight, which indicates a center position of distribution of light reception probability of the first light receiving unit in the first histogram, and a center position of reference light, which indicates a center position of distribution of light reception probability of the second light receiving unit in the second histogram, by using a value, corresponding to a light reception pulse width of the second light receiving unit, which is obtained by normalizing a total value of frequencies in the second histogram with respect to a frequency of the maximum bin in the second histogram and that also computes the distance between the light sensor and the sensing object on a basis of a difference between the center position of the reflection light and the center position of the reference light, in which a component corresponding to the reflection light by the sensing object is an object reflection light component, a component corresponding to the first disturbance light is a first disturbance light component, a component corresponding to the reflection tight by the inside of the light sensor is a crosstalk component in the first histogram, and a component corresponding to the reference light from the light emitting element is a reference light reception component and a component corresponding to the second disturbance light is a second disturbance light component in the second histogram.

12. The light sensor according to claim 11, wherein
the first light receiving unit includes a plurality of first light receiving units,
the first histogram generation unit includes a plurality of first histogram generation units whose number is the same as the number of the plurality of first light receiving units,
the plurality of first light receiving units and the plurality of first histogram generation units have one-to-one correspondence, and
the computation unit computes the distance between the light sensor and the sensing object on a basis of a plurality of first histograms generated by the plurality of first histogram generation units and the second histogram.

13. The light sensor according to claim 11, wherein
a correspondence relationship between the difference between the center position of the reflection light and the center position of the reference light and the distance between the light sensor and the sensing object is defined in advance, and
the computation unit computes the distance between the light sensor and the sensing object from the difference between the center position of the reflection light and the center position of the reference light on a basis of the correspondence relationship.

14. An electronic device comprising the light sensor according to claim 11.

15. A computation apparatus applied to a light sensor that measures a distance to a sensing object, wherein
the light sensor includes:
a light emitting element that radiates pulse light to the sensing object;
one or more first light receiving units of a photon count-type that output a first pulse synchronized with incidence of a photon by at least one of reflection light by the sensing object, first disturbance light, and reflection light by an inside of the light sensor; and
a second light receiving unit of a photon count-type that outputs a second pulse synchronized with incidence of a photon by at least any of second disturbance light and reference light from the light emitting element; and
the computation apparatus includes:
one or more first histogram generation units that generate a first histogram indicating a relationship between an output time and a pulse frequency of the first pulse;
a second histogram generation unit that generates a second histogram indicating a relationship between an output time and a pulse frequency of the second pulse; and
a computation unit that computes a center position of reflection light, which indicates a center position of distribution of light reception probability of the first light receiving unit in the first histogram, and a center position of reference light, which indicates a center position of distribution of light reception probability of the second light receiving unit in the second histogram, by using a value, corresponding to a light reception pulse width of the second light receiving unit, which is obtained by normalizing a total value of frequencies in the second histogram with respect to a frequency of the maximum bin in the second histogram and that also computes the distance between the light sensor and the sensing object on a basis of a difference between the center position of the reflection light and the center position of the reference light, in which a component corresponding to the reflection light by the sensing object is an object reflection light component, a component corresponding to the first disturbance light is a first disturbance light component, a component corresponding to the reflection light by the inside of the light sensor is a crosstalk component in the first histogram, and a component corresponding to the reference light from the light emitting element is a reference light reception component and a component corresponding to the second disturbance light is a second disturbance light component in the second histogram.

* * * * *